United States Patent [19]
Hayashi et al.

[11] Patent Number: 5,536,987
[45] Date of Patent: Jul. 16, 1996

[54] ALTERNATING CURRENT GENERATOR FOR A MOTOR VEHICLE

[75] Inventors: Seiji Hayashi, Okazaki; Atsushi Umeda, Anjyo; Shin Kusase, Obu, all of Japan

[73] Assignee: Nippondenso Co., Ltd., Kariya, Japan

[21] Appl. No.: 346,296

[22] Filed: Nov. 23, 1994

[30] Foreign Application Priority Data

Nov. 29, 1993 [JP] Japan .................................. 5-297974
Jul. 27, 1994 [JP] Japan .................................. 6-175561
Sep. 6, 1994 [JP] Japan .................................. 6-212701

[51] Int. Cl.$^6$ ..................................... H02K 1/22
[52] U.S. Cl. ........................... 310/263; 310/44; 310/156
[58] Field of Search .................... 310/263, 156, 310/44, 64

[56] References Cited

U.S. PATENT DOCUMENTS 4,959,577  9/1990  Radomski ................................ 310/263
5,306,977  4/1994  Hayashi ................................... 310/263

FOREIGN PATENT DOCUMENTS 61-85045  4/1986  Japan .
4-255451  9/1992  Japan .

*Primary Examiner*—R. Skudy
*Attorney, Agent, or Firm*—Cushman, Darby & Cushman

[57] ABSTRACT

An alternating current generator for a motor vehicle includes magnet type field cores, i.e., field cores with claw poles on which permanent magnets are interposed in the spaces between the claw poles, where the generator has a ratio of number of claw poles/outside diameter of the field core that allows generation of a large output current. The alternating current generator includes permanent magnets disposed in spaces between peripherally adjacent claws which reduce the magnetic flux leakage caused by the field coil occurring in the spaces. When a residual magnetic flux density higher than 0.25 tesla is applied in advance in a direction that reduces magnetic flux, a large output current is obtained when the above-noted ratio is in the range of from about $1.6 \times 10^{-1}$ to $2.0 \times 10^{-1}$ (1/mm).

11 Claims, 4 Drawing Sheets

ALTERNATING CURRENT GENERATOR FOR A MOTOR VEHICLE

BACKGROUND OF THE INVENTION

1. Field of the Invention

This invention relates to an alternating current generator for a motor vehicle having field cores equipped with claw poles and having permanent magnets disposed between adjacent claw poles.

2. Related Art

A synchronous generator ("alternator") including Lundell-type field cores, i.e., field cores with claw poles, wound with field coils, on a drive shaft is generally used as an alternating current generator for a motor vehicle.

Japanese Patent Laid-Open No. S61-85045 discloses interposing permanent magnets in spaces between neighboring claw poles on field cores with claw poles, and magnetizing these magnets in a direction opposite the magnetic flux leakage between the claw poles in order to reduce the magnetic flux leakage. Such field cores with claw poles are described as magnet type field cores hereinafter.

For an alternating current generator for a motor vehicle, there is a strong demand to maximize the output/weight ratio, i.e., the output/volume ratio, so that there has been a certain optimum style in the Lundell-type field core. The field coil of this type is described below as a non-magnetic field core because it has no permanent magnets disposed between the claw poles.

In general, maximum output I of a generator is determined by the following equation (1).

$$I = K_o \cdot D^2 L \cdot Bg \cdot (ac) \quad (1)$$

Here, $K_o$ represents a constant depending upon the drive pulley ratio, coil coefficient or armature and other factors, $D^2L$ represents the energy conversion space volume, which is determined by the outside diameter D of rotor and the thickness or axial length L of the stator core (armature iron core), Bg is the space or air gap magnetic flux density and ac is the ampere conductor applicable to the inside diameter section of the armature, i.e. the ampere turn/$\pi$D (A/mm). Bg is proportional to the ratio of effective magnetic flux $\Phi g$ out of the generated magnetic flux $\Phi s$, i.e the magnetic efficiency $\eta$. Furthermore, the ampere conductor ac depends mainly on the number of windings of the armature coil, and, as it is understood from the fact that where there are more poles, the same voltage can be obtained with a lesser number of windings. Ampere conductor ac is also proportional to the pole number P. In other words, the output I can be expressed as follows in equation (2):

$$I = K_o' \cdot D^2 L \cdot \eta \cdot (P/D) \quad (2)$$

Thus, it is well known that I is proportional to the magnetic efficiency $\eta$ and (P/D) as well as the physical structure.

Although equation (2) suggests that the output should increase as the pole number P increases as long as the physical structure is the same ($D^2L$ and D are constant), it is known qualitatively that the optimum pole number P must be determined as a matter of course, as the magnetic efficiency $\eta$ actually drops. See the characteristic example provided in FIG. 5 illustrating the situation "Without magnet".

SUMMARY OF THE INVENTION

Thus, the present inventors have realized that there is a relationship between respective parameters quoted above. That is:

$$\text{Effective Magnetic Flux } \Phi g \propto \text{Pole to pole magnetomotive force/(Air Gap Magnetic resistance + Magnetic Pole Magnetic Resistance)} \quad (3)$$

$$\propto \text{Magnetomotive Force of Field/((Space length/pole area) + Pole Magnetic resistance)} \quad (4)$$

Because the magnetic resistance of the poles is negligible when the magnetic poles are not saturated:

$$= K_1 \cdot DL \cdot U/P \quad (5)$$

$K_1$ represents a constant that includes the magnetomotive force of field, U the ratio occupied by the pole arc in single pole pitch, i.e., the occupying ratio of the pole, also known as an arc ratio.

The magnetic flux leakage $\Phi 1$ is expressed as follows:

$$\text{Magnetic Flux Leakage } \Phi 1 \propto \text{Pole to Pole Magnetomotive Force/Pole Side to Pole Side Magnetic Resistance} \quad (6)$$

$$\propto \text{Pole to Pole Magnetomotive Force/(Pole Side to Pole Side Magnetic Resistance/Pole Side Area)} \quad (7)$$

$$= K2 \cdot PL/(D(1-U)) \quad (8)$$

Therefore, from the equations for the magnetism $\Phi g$ and $\Phi 1$, the magnetic efficiency $\eta = \Phi g/(\Phi g + \Phi 1)$ is expressed as follows:

$$\eta = (K_1 DLU/P)/(K_1 DLU/P + K_2 PL/D(1-U)) \quad (9)$$

Simplifying, one arrives at:

$$\eta = 1/(1 + (K_2/K_1) \cdot (U/(1-U)) \cdot (P/D)^2) \quad (10)$$

It is known that the shape of the pole, space length and other factors should be taken to be approximately constant for convenience of magnetic noise and machining, so U is usually set in the range of from about 0.6–0.7. Thus, the output current I can be summarized as follows:

$$I = K_3 \cdot D^2 L \cdot (P/D) / (1 + K \cdot K_2 (P/D)^2) \quad (11)$$

In other words, the present inventors have discovered that there is a principle that allows the output current I to be a function having a maximum value at (P/D), and when the leakage is small, i.e., $K_2$ is small, the maximum value moves to a range of larger (P/D) and at the same time the maximum value itself becomes larger. Actually, since the effective magnetic flux increases disproportionately to decreases in the magnetic flux leakage, the output current saturates when the poles are saturated by the effective magnetic flux. Therefore, the maximum value does not move beyond a certain value of (P/D).

The object of the present invention is to solve the problems noted above in known alternators and to present an alternating current generator for a motor vehicle, which has the ratio of the claw pole number P/outside diameter D that allows generation of the maximum output current using magnetic type field cores, i.e., field cores having claw poles in which permanent magnets are interposed therebetween.

The present invention includes a rotary field type rotary armature that comprises a housing, a drive shaft mounted in the housing to freely rotate, a cylindrical armature core supported on the internal periphery of the housing, an armature coil wound about the armature core, field cores with claw poles attached to the drive shaft, field cores attached to the drive shaft, field coils wound about the field cores and permanent magnets interposed between the sides of the claw poles to reduce the magnetic flux crossing the armature core. The residual magnetic flux of the permanent magnets is set higher than 0.25 tesla and the ratio of the number of poles/outside diameter, otherwise known as the ratio of the claw pole number/outside diameter of the field core, is set within the range of from about $1.6 \times 10^{-1}$–$2.0 \times 10^{-1}$ (1/mm).

In the invention, the permanent magnets are preferably sintered magnets made of a ferrite that is magnetized to provide a flux higher than 0.25 tesla between the claw poles in the case without magnets, disposed over nearly the entire surface of the sides in peripheral direction of claw poles and on all claw poles, and are magnetized in the direction so as to reduce the magnetic flux leakage between claw poles magnetized by the field coil. The coercive force of the permanent magnets that have an adequate thickness to be disposed in the specified space between the poles is sufficiently large so that the direction of magnetization with the permanent magnets will not be inverted by magnetizing the field coil.

In the above mentioned device, the outside diameter of the field core is set approximately in the range of from 80–110 mm and the number of claw poles is preferably within the range of from 16–20. Also, the permanent magnets are made of sintered ferrite. Further, heat radiating spaces are disposed between the internal sides in the peripheral direction of the armature coil.

The permanent magnets may have grooves to accommodate the claw poles and at the same time be cylindrically shaped. The permanent magnets may be secured between the claw poles in such a manner as to be buried in resin holders.

In the alternating current generator for a motor vehicle, the permanent magnets interposed in the spaces between neighboring claw poles disposed in the peripheral direction reduce the magnetic flux leakage that is caused by the field coil and which would otherwise occur between the spaces. In other words, according to the principle described above, the magnets disposed on the sides of the claw poles decrease the magnetic flux leakage $\Phi L$ compared with a case in which permanent magnets are not provided, and consequently the output increases.

Thus, in the present invention, the claw pole number P was increased as much as the ratio of the number of poles/outside diameter, i.e., the ratio of the claw pole number/outside diameter of field core became larger than the ratio of the number of poles/outside diameter that produces the maximum output current under the condition that no permanent magnets are provided. According to the experimental results shown in FIG. 5, it was discovered that the principle was verified because, where the permanent magnets are interposed contrary to the case without the magnets, the maximum value moved, the adequate P/D range turned out to be 0.1–0.2 with the residual magnetic flux density of the permanent magnet being higher than 0.25 tesla. The maximum value also became larger compared with the conventional case.

As described above, according to the present invention, since the ratio of the number of poles/outside diameter is set larger than the case of non-magnet type field cores and the residual magnetic flux ratio of the permanent magnets is set at $1.62 \times 10^{-1}$(1/mm) in a range higher than 0.25 tesla, not only can the output be increased more than the conventional alternating current generator for a motor vehicle that uses a non-magnetic type field core, but also the present invention offers an improvement over the alternating current generator utilizing a magnet type field core.

The present invention also achieves superior cooling as radiating spaces are secured between the internal surface in the peripheral direction of the permanent magnets and the external surface in the peripheral direction of the armature coil.

Further, the present invention provides for a better bonding between the permanent magnets and the claw poles because the permanent magnets are provided with grooves to accommodate the claw poles and at the same time are formed in a cylindrical shape. In the present invention, as the permanent magnets may be secured between the claw poles in a manner so as to be buried in resin holders, the permanent magnets can be easily assembled during rotor manufacture, and also the magnets are protected from foreign substances.

BRIEF DESCRIPTION OF THE DRAWINGS

Other objects, features and characteristics of the present invention as well as the function of related parts will be better understood from a study of the following detailed description, the appended claims, and the drawings. In the drawings:

DETAILED DESCRIPTION OF THE PRESENTLY PREFERRED EXEMPLARY EMBODIMENTS

Figure 1:
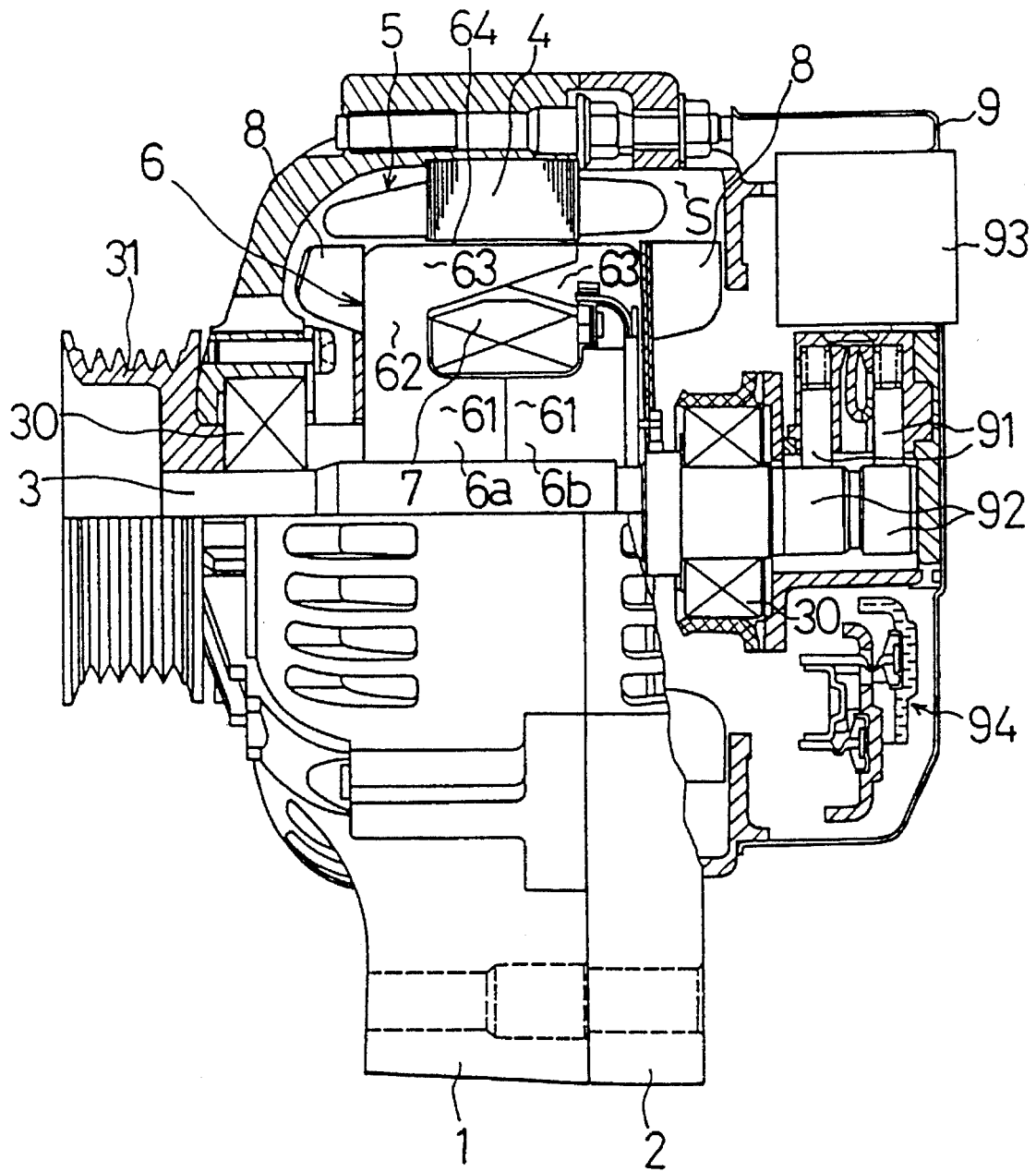
FIG. 1 is a sectional view of a rotary field type rotary electric machine of one embodiment of the present invention.

FIG. 1 shows the rotary field type rotary electric machine of the first embodiment of the present invention. This generator represents a three-phase alternating current generator ("alternator") that is disposed at the front of a motor vehicle engine (not illustrated) installed in a vehicle's engine compartment. The alternator includes front housing 1 and rear housing 2, which are connected to each other to form closed space S and to support drive shaft 3 via bearings 30, which allow free rotation of the shaft 3.

Cylindrical armature core 4 is installed and secured on the internal periphery of rear housing 2. Armature coil 5 is wound around core 4, and field coil 7 is installed on field core 6 which comprises two half field iron cores 6a and 6b coupled tightly in an axial direction.

Figure 3:
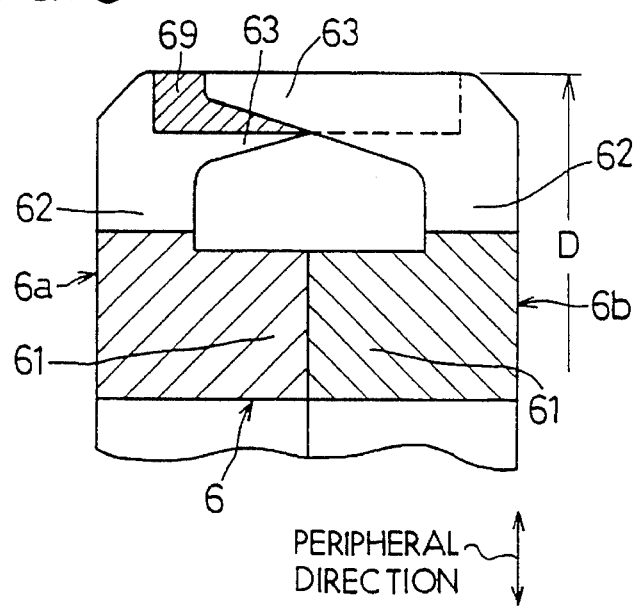
FIG. 3 is a front view of the field core used in the embodiment of FIG. 1.
Figure 4:
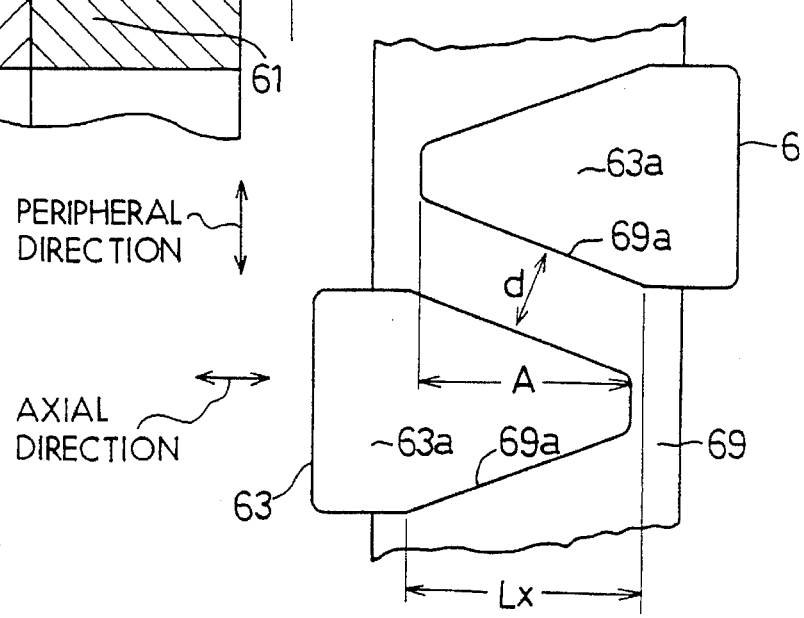
FIG. 4 is an exploded view illustrating the outer periphery of the half field cores according to the embodiment of FIG. 1.

The plurality of permanent magnets 69 installed between a gap of claw poles ("claws") 63 of field core 6 are illustrated in FIGS. 3 and 4, but are not shown in FIG. 1.

Pulley 31, which is drive by the vehicle's engine (not shown) is disposed at an outside of the front end of front housing 1, and is disposed around drive shaft 3. Cooling fans 8 are secured on columns 62 on both axial ends of field core 6 with claws.

Resin cover 9 is secured to rear housing 2 in a manner so as to encircle the rear end face of rear housing 2. Brushes 91 supply the field current to field coil 7 in resin cover 9. On drive shaft 3, slip rings 92 are installed in such a manner so as to contact the brushes 91. In resin cover 9, voltage regulator 93 adjusts the generator output by the field current control, and rectifier 94 rectifies the output voltage from armature coil 5 by three-phase rectification.

A three-phase alternating current is generated on armature coil 5 by the revolution of drive shaft 3 with the field current being conducted to the field coil 7. The generated voltage is controlled by controlling the field current by voltage regulator 93 and is rectified by rectifier 94.

Figure 2:
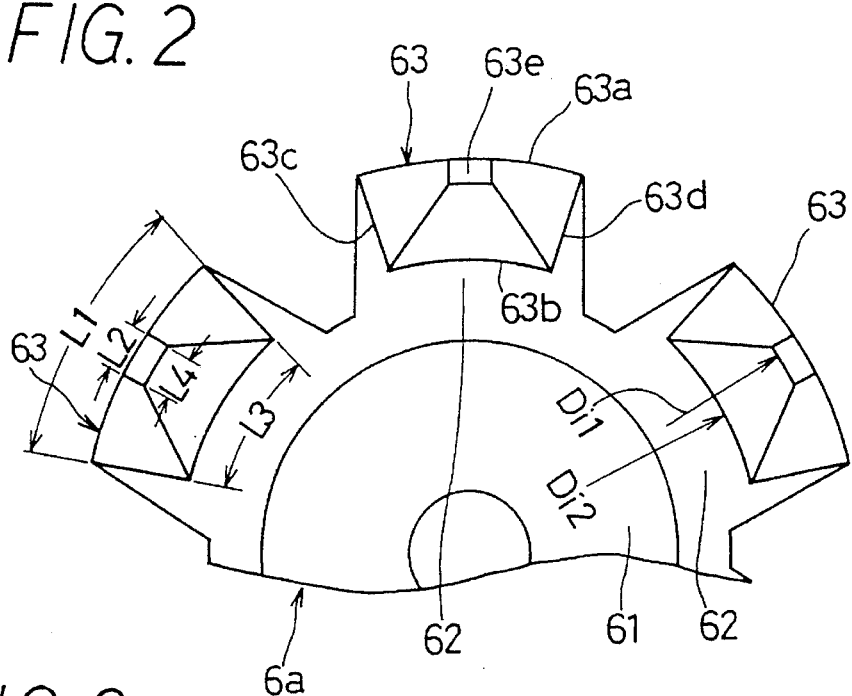
FIG. 2 is an elevational view of the half field core used in the embodiment of FIG. 1.

Half field cores 6a and 6b are described in detail with reference to FIGS. 2 through 4. Note that FIG. 2 is a front elevational view taken in the axial direction from the side of pulley 31 in FIG. 1 and in the axial direction of half field core 6a. FIG. 3 is a side elevational view of field core 6. FIG. 4 illustrates the external periphery of half field cores 6a and 6b.

Half field cores 6a and 6b are respectively formed of base cylinder 61 disposed at the interior of armature core 4 and disposed at the center of drive shaft 3. End columns 62 extend radially from both axial ends of base cylinder 61. Claws 63, eight in this embodiment, extend from the edges of columns 62 in such a manner as to face one another. The right end face of base cylinder 61 of half field core 6a and the left end face of base cylinder 61 of half field core 6b are joined to each other. Field coil 7 is wound around base cylinder 61 and claws 63 encircle field coil 7. Claws 63 are disposed alternately at specified intervals from both ends of columns 62 in a peripheral direction and at the same time are narrowed toward their edges in the axial direction.

The shape of claws 63 will now be described in detail below.

Each claw 63 includes surface 63a formed as a partial cylindrical surface, surface 63b disposed at an internal periphery of claw 63 as a conical surface, surfaces 63c and 63d disposed at both sides of claw 63 and comprising planes extending approximately in the axial direction, and end face 63e having a plane extending in both the axial and straight directions, and which extends in the axial direction from the external periphery of the side end faces of end column 62 so as to be disposed facing one another. Both side faces 63c and 63d facing one another are shaped to slightly narrow in peripheral direction toward the outer periphery so that permanent magnets that are accommodated in the spaces between the side faces 63c and 63d are held in position by claws 63 not to be flung away in the centrifugal direction.

The dimensions of claw 63 are now described.

Outside diameter D of field core 6 that extends from the center of shaft 3 to surface 63a at the periphery of claw 63 is set to be 80 mm. Distance A (FIG. 4) in the axial direction from the end of leftward claw 63 to that of rightward claw 63 is set at 26 mm. Length Lx of armature core 4 in the axial direction is designed to be 5% larger than distance A so that surface 63a at the peripheral side of each claw 63, which stands at the opposite end against the internal peripheral surface of armature core 4 via air gap (not illustrated) turns out to be an effective pole face. On peripheral surface 63a as shown in FIG. 2, at the position of outside diameter D, the rate of peripheral length L1 of end claw 63 occupying its entire periphery is set to be 100% and the rate of length L2 also occupying the entire periphery is set to be about 32%.

On surface 63e of internal periphery of claw 63, diameter Dil is 76 mm and diameter Di2 of base claw 63 is set at 60 mm. On surface 63b, the rate of peripheralslength L3 at base claw 63 spanning the entire periphery is designated to be 80% and length L4 is set at 32%.

Permanent magnets 69 have a cylindrical shape and have a plurality of grooves provided to insert claws 63 as shown by FIG. 4. Surface of grooves 69a is bonded to both side faces 63c and 63d and end face 63e. Surface 69a at peripheral side of magnet 69 is formed of a sintered magnet and surface 69a forms a cylindrical surface together with the surface 63c at peripheral side of claw 63. The inside diameter of permanent magnet 69 is set at 60 mm.

In the present embodiment, since claw 63 of left half field core 6a makes an N pole and claw 63 of right half field core 6b makes an S pole, groove surface of permanent magnet 64 contacting claw 63 of left half field core 6a is magnetized in advance to an N pole and groove surface of permanent magnet contacting right half field core 6b to an S pole. Thus, the magnetic flux leakage ΦL between neighboring claw 63 and 63 decrease. Permanent magnets 69 were made of sintered aleotropic ferrite which is equivalent to FB-5H, a product of TDK Corporation of Japan, and the residual magnetic flux was 0.4 tesla at 20° C. and the coercive force was 399 kA/m at 0° C.

The magnetomotive force of a magnet is proportional to the residual magnetic flux density of the magnet. However, since there is a proportional relationship between the residual magnetic flux density and the coercive force, either the residual magnetic flux density or the coercive force may be used to set the magnetomotive force of a magnet. Consequently, any type of permanent magnets may be used for permanent magnet 69 provided that the capacity of residual magnetic flux density or coercive force is not lower than the sintered ferrite magnet.

The diameter of drive shaft 3 is 15 mm, the outside diameter of cylindrical armature core 4 is 96 mm, the inside diameter of the same is 80.6 mm, the depth of each slot is 5 mm, the slot width of twelve poles is 3.0 mm, the number of slots is three times the number of field cores and the slot width is adjusted proportionately with the number of slots. The outside diameter of field core 6 was set at 38 mm and the overall length in the axial direction of field core 6 is set at 46 mm.

Field core 6 is made of soft iron and the exciting current was set at 4 amps while the exciting force was set at 1,572 AT.

Using an alternating current generator for a motor vehicle equipped with field core 6 composed in accordance with the above description, the inventors provided a plurality of models with which outside diameter D of field core 6 was changed at various values, with the dimensions of respective parts being adjusted proportionately and the number of claws 63 (poles) being changed to determine how the maximum output current changes. These results are set forth in FIG. 5. Continuous lines in the chart indicate the maximum output current of conventional models having the same construction, but without permanent magnets 69.

Figure 5:
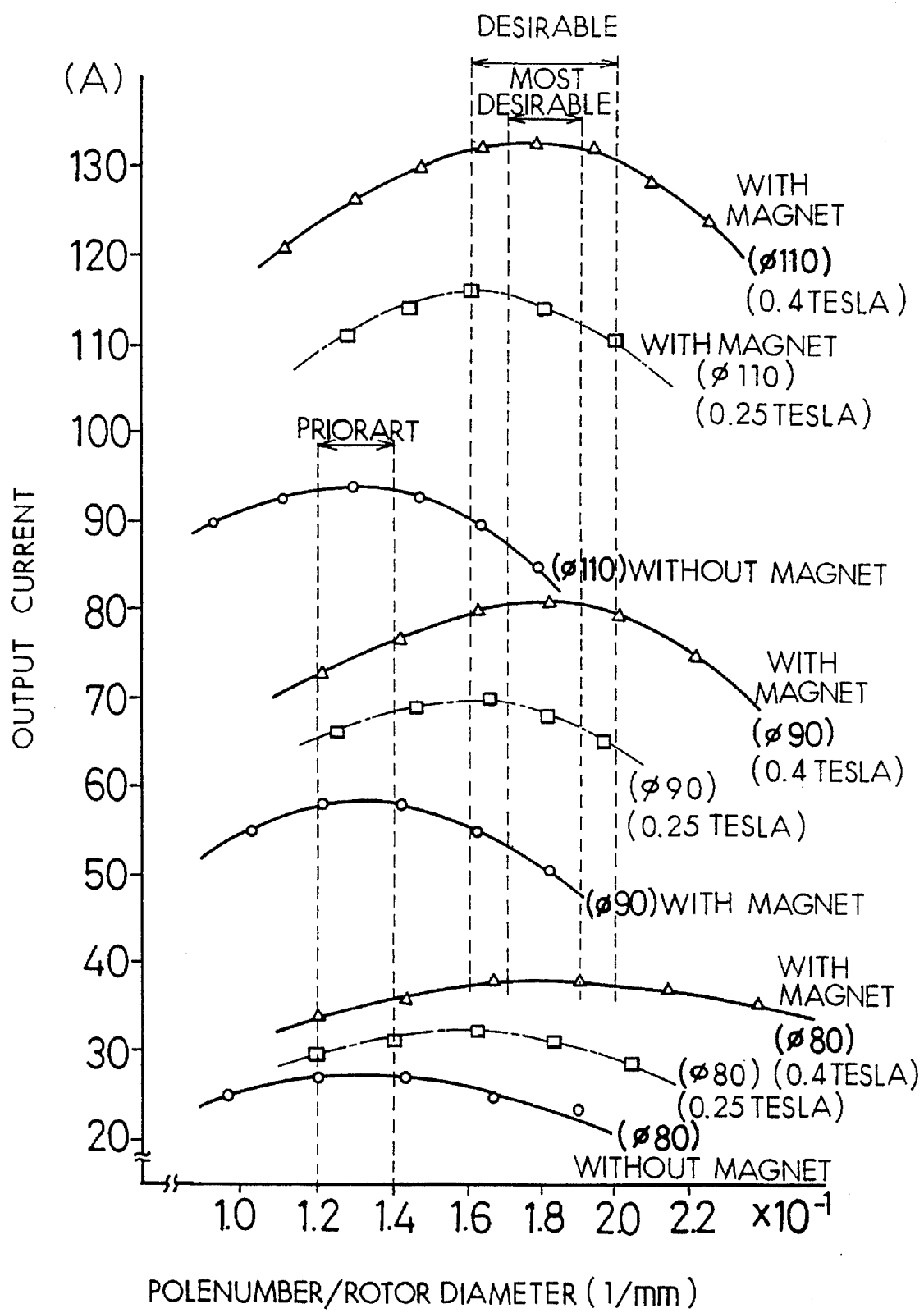
FIG. 5 is a characteristic chart depicting the relationship between the pole number/outside diameter ratio and the maximum output current of the embodiment and conventional products.

Because the number of revolutions when the effective output current is generated changes when the number of poles is changed, all of the characteristic lines in FIG. 5 are designed so that the output currents begins charging a 14.5 V battery at 1,000 rpm by adjusting the number of windings on the armature coil 7.

By interposing permanent magnets 69 in the spaces between claws 63, the magnetic flux leakage ΦL decreases considerably and the extent of effective flux equivalent to or more of the reduction in the leakage, which is discharged from the surface 63a of outside periphery of each claw 63 to the armature coil 7, increases and the maximum output current also rises proportionately. With the Lundell-type rotator without permanent magnets, the maximum output current is generated, regardless of the change in the diameter, when the ratio of pole number/outside diameter, i.e., the ratio of pole number/outside diameter D, is in the range of from about $1.2\times10^{-1}$–$1.4\times10^{-1}$(1/mm), but, with the Lundell-type rotator having permanent magnets 69 according to the present embodiment, it is discovered that the maximum current output is obtained in the range of $1.6\times10^{-1}$–$2.0\times10^{-1}$(1/mm). It is more preferable to set the maximum current output in the range of from $1.7\times10^{-1}$–$1.9\times10^{-1}$(1/mm).

The added permanent magnets 69 are considered substantially equal to the increase in the length of spaces between claws 63 so that, even if the substantial length of spaces between claws is same as the conventional case, the output current can be increased by increasing the number of claws.

If the number of claws/poles is increased too much, the magnetic flux leakage ΦL increases so that the maximum current drops. In FIG. 5, the alternate long and short dashed lines indicate the change in the maximum output current when the number of poles is changed after the residual magnetic flux density is set at 0.25 tesla at 20° C. From FIG. 5, it will be understood that the maximum current is achieved when the pole number/outside diameter ratio is approximately 1.6.

If the residual magnetic flux density of a magnet is set higher than 0.45 tesla, the poles saturate because the effective magnetic flux increases so that the maximum output current fails to increase and the pole number/outside diameter ratio stays at a nearly constant value as 0.4 tesla.

When the permanent magnets are interposed, the magnetic flux ratio between the claws without magnets is approximately 0.1–0.2 tesla, thus making it better to use permanent magnets having a flux ratio higher than 0.25 tesla. The pole number/outside diameter ratio should be preferably in the range of from $1.6\times10^{-1}$(1/mm), at which the peak of maximum current output is achieved at 0.25 tesla, to $2.0\times10^{-1}$(1/mm), at which a large output current close to the maximum value is achieved at values higher than 0.25 tesla, which includes a flux saturation.

Since the residual magnetic flux density is acceptable so far as it is higher than 0.25 tesla, it can be easily achieved by inexpensive ferrite magnets. Moreover, the ferrite magnets can present a high quality generator because they are not demagnetized at high temperatures. Thus, if the permanent magnets are interposed, an output current at the vicinity of the maximum value can be achieved within the range of said pole number/outside diameter ratio at $1.6$–$2.0\times10^{-1}$(1/mm).

Magnets made of rare earths may be used in place of ferrite magnets. However, such magnets tend to increase manufacturing cost. However, if cost is not an important consideration, any magnet material can be used provided the residual flux density is higher than 0.15 tesla at 20° C. Further, the permanent magnets do not need to encircle the surface 63c and 63d of claw 63. When more than 60% of the surface is covered, the maximum current was obtained in the range of pole number/outside diameter at $1.6\times10^{-1}$–$2.0\times10^{-1}$(1/mm).

Figure 6:
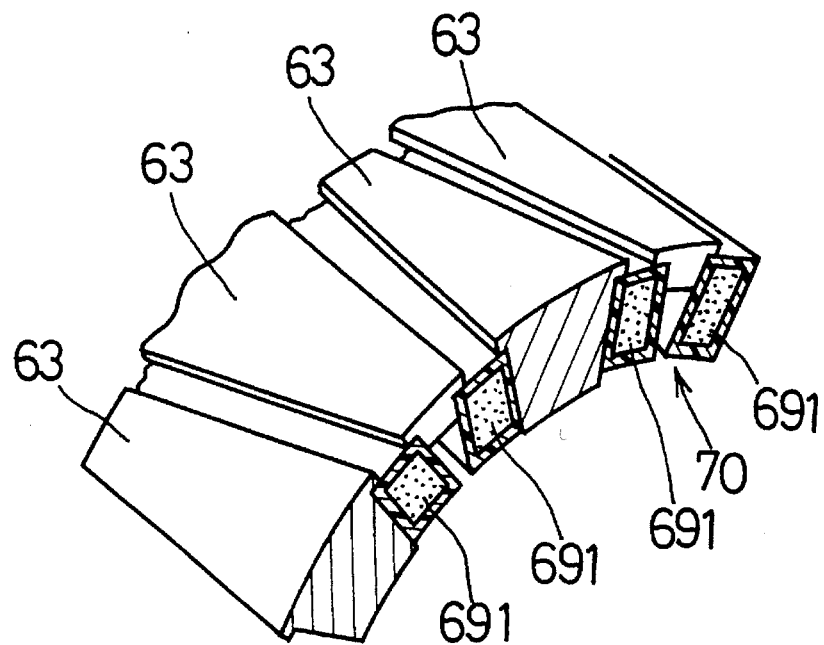
FIG. 6 is a partial perspective view of another holding method for the permanent magnets.
Figure 7:
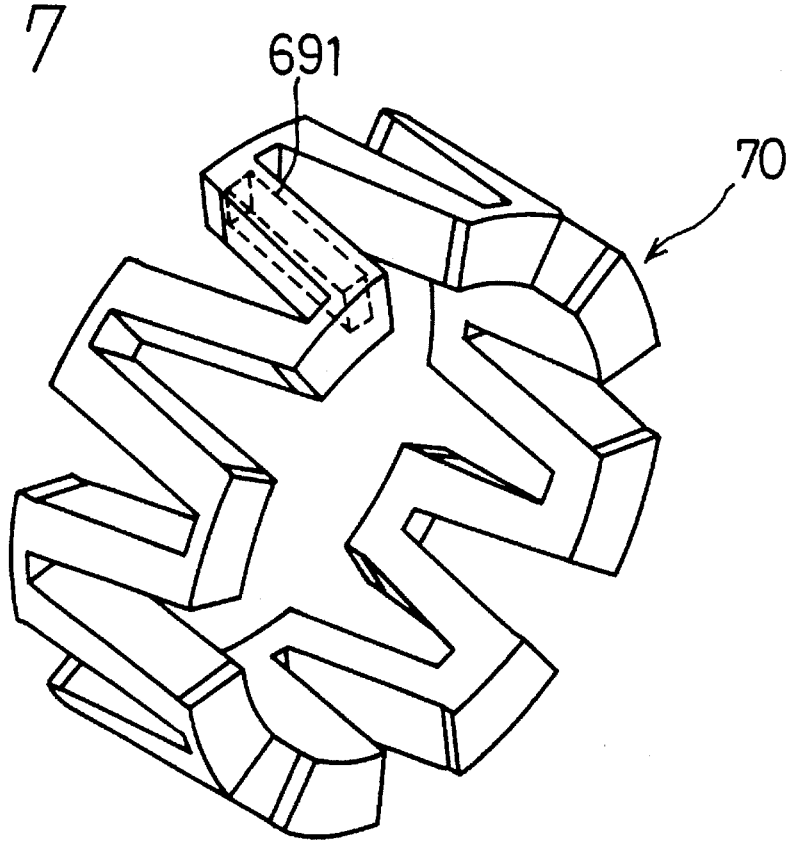
FIG. 7 is a perspective view of a resin holder, which may be used as shown in FIG. 6.

Also, as shown in FIGS. 6 and 7, a plural number of bar magnets 691 buried in resin holders 70 may be used to assimilate a crown as a whole and interposed in the spaces between claws 63.

While this invention has been described in connection with what is presently considered the most practical and preferred embodiment, this invention is not to be limited to the disclosed embodiment, but is meant to cover all modifications and equivalent arrangements included within the spirit and scope of the appended claims.

What is claimed is:

1. An alternating current generator for a motor vehicle said generator comprising:

a housing, a drive shaft retained by said housing so as to rotate freely, a cylindrical armature core supported on an inner peripheral surface of said housing, an armature coil wound about said armature core, a field core with claw poles mounted on said drive shaft, a field coil wound about said field core, and permanent magnets interposed between peripheral side faces of said claw poles so as to reduce a magnetic flux leakage between said claw poles and simultaneously to cross magnetic flux over said armature core, said permanent magnets having a residual magnetic flux density higher than 0.25 tesla, and said field core having a ratio of a number of poles to an outside diameter in a range of from about $1.6\times10^{-1}$ to $2.0\times10^{-1}$ (1/mm).

2. An alternating current generator for a motor vehicle as claimed in claim 1, wherein said outside diameter of said field core is set at about 80–110 mm and a number of claw poles is in a range of from 16–20 pieces.

3. An alternating current generator for a motor vehicle as claimed in claim 1, wherein said permanent magnets are made of sintered ferrite magnets.

4. An alternating current generator for a motor vehicle as claimed in claim 2, wherein said permanent magnets are made of sintered ferrite magnets.

5. An alternating current generator for a motor vehicle as claimed in claim 1, wherein heat radiating spaces are provided between an inside face of said magnets in a radial direction of said magnets and an outside face in a radial direction of said field coil.

6. An alternating current generator for a motor vehicle as claimed in claim 1, wherein said permanent magnets have grooves in which said claw poles are buried and said permanent magnets have a cylindrical shape.

7. An alternating current generator for a motor vehicle as claimed in claim 1, wherein said permanent magnets are secured between said claw poles in a manner buried in resin holders.

8. An alternating current generator, comprising:

a housing;

an armature disposed in said housing;

a field core having a plurality of claw poles disposed in said housing;

a field coil wrapped around said field core to magnetize said claw poles; and permanent magnets interposed between adjacent ones of said claw poles;

wherein a number of claw poles divided by an outside diameter of said field core is in a range of from $1.6 \times 10^{-1}$ to $2.0 \times 10^{-1}$ (1/mm) so that said armature generates maximum output current.

9. An alternating current generator as claimed in claim 8, wherein said permanent magnets are sintered magnets.

10. An alternating current generator as claimed in claim 9, wherein said magnets are made of ferrite that has a magnetization higher than 0.25 tesla.

11. An alternating current generator as claimed in claim 10, wherein said magnets are magnetized in a direction that reduces magnetic flux leakage between said claw poles magnetized by said field coil.

* * * * *